United States Patent
Anand et al.

(10) Patent No.: US 10,796,356 B2
(45) Date of Patent: Oct. 6, 2020

(54) TRANSFORMATION AND AGGREGATION ENGINE

(71) Applicant: Walmart Apollo, LLC, Bentonville, AR (US)

(72) Inventors: Raj Anand, Santa Clara, CA (US); Ponsankar Shanmugam Semmandampalayam, Cupertino, CA (US); Ruchitkumar Shah, Fremont, CA (US); ManoharReddy Vummadi, Fremont, CA (US)

(73) Assignee: Walmart Apollo, LLC, Bentonville, AR (US)

(*) Notice: Subject to any disclaimer, the term of this patent is extended or adjusted under 35 U.S.C. 154(b) by 285 days.

(21) Appl. No.: 15/884,272

(22) Filed: Jan. 30, 2018

(65) Prior Publication Data
US 2019/0236683 A1    Aug. 1, 2019

(51) Int. Cl.
*G06Q 30/00* (2012.01)
*G06Q 30/06* (2012.01)
*H04L 29/08* (2006.01)
*G06F 16/00* (2019.01)
*H04L 12/66* (2006.01)

(52) U.S. Cl.
CPC ......... *G06Q 30/0633* (2013.01); *G06F 16/00* (2019.01); *H04L 67/2833* (2013.01); *H04L 12/66* (2013.01); *H04L 67/02* (2013.01); *H04L 67/2823* (2013.01)

(58) Field of Classification Search
None
See application file for complete search history.

(56) References Cited

U.S. PATENT DOCUMENTS

| | | | |
|---|---|---|---|
| 8,756,119 B1* | 6/2014 | Andrews | G06Q 30/06 705/1.1 |
| 2003/0171998 A1* | 9/2003 | Pujar | G06Q 10/087 705/26.81 |
| 2010/0274610 A1* | 10/2010 | Andersen | G06Q 10/087 705/28 |
| 2017/0341795 A1* | 11/2017 | Colson | B33Y 10/00 |

* cited by examiner

*Primary Examiner* — Mila Airapetian
(74) *Attorney, Agent, or Firm* — Duane Morris LLP; Manita Rawat

(57) ABSTRACT

A system has a gateway cluster having a gateway processor for communication with an external processor of an external user using a first protocol and data format. A non-transitory storage medium is configured for storing a database containing unfilled orders associated with the external user. An application cluster has a processor in communication with the storage medium for accessing the database. The gateway processor can communicate with the application processor using a second protocol and data format different from the first protocol and data format. The application processor is configured for fetching and aggregating unfilled orders from the database, and transmitting an aggregation of orders to the external processor via the gateway cluster in response to a number of unfilled orders being at least a threshold number, a size of the aggregation of orders being at least a threshold size, or expiration of a predetermined time period.

20 Claims, 6 Drawing Sheets

TRANSFORMATION AND AGGREGATION ENGINE

FIELD

This disclosure relates generally to computing networks, and more specifically to computing networks interfacing with external systems using heterogeneous protocols.

BACKGROUND

Enterprise computer networked systems may have multiple integration points for external systems and networks with which they communicate. For example, in a business environment, an enterprise may interact with the networks of several customers, vendors and/or drop-ship vendors (DSV). These external networks may use a variety of heterogeneous communication protocols and data formats.

The external networks may be added on an ad hoc basis over time. As a result, communications support hardware and software for each of the external networks may result in a complex architecture for the enterprise. Many legacy systems developed over time have limited processing capacity and may not scale readily to support larger transaction volume.

SUMMARY

According to an aspect, a system comprises a gateway cluster having at least one gateway processor configured for communication with at least one external processor of a first external user using a first communication protocol and a first data format. A non-transitory machine readable storage medium is configured for storing a database containing a plurality of unfilled orders associated with the first external user. An application cluster has at least one application processor in communication with the storage medium for accessing the database. The at least one gateway processor is configured for communicating with the at least one application processor using a second communication protocol and a second data format different from the first communication protocol and the first data format. The at least one application processor is configured for fetching and aggregating unfilled orders from the database, and transmitting an aggregation of orders to the external processor via the gateway cluster in response to a total number of unfilled orders associated with the first external user being at least a threshold number, a size of the aggregation of orders being at least a threshold size, or expiration of a predetermined time period.

According to another aspect, a method comprises: receiving data from at least one external processor of a first external user via a gateway cluster having at least one gateway processor, the receiving using a first communication protocol and a first data format between the external processor and the gateway cluster; fetching a plurality of unfilled orders associated with the first external user from a database; aggregating the unfilled orders into a single file or message containing the aggregation of orders; and transmitting the aggregation of orders to the external processor via the gateway cluster in response to a total number of unfilled orders associated with the first external user being at least a threshold number, a size of the aggregation of orders being at least a threshold size, or expiration of a predetermined time period. The transmitting includes communicating between the at least one application processor and the gateway cluster using a second communication protocol and a second data format different from the first communication protocol and the first data format.

According to another aspect, a non-transitory, machine readable storage medium is encoded with program instructions, wherein when a processor executes the programmed instructions, the processor performs the method comprising: receiving data from at least one external processor of a first external user via a gateway cluster having at least one gateway processor, the receiving using a first communication protocol and a first data format between the external processor and the gateway cluster; fetching a plurality of unfilled orders associated with the first external user from a database; aggregating the unfilled orders into a single file or message containing the aggregation of orders; and transmitting the aggregation of orders to the external processor via the gateway cluster in response to a total number of unfilled orders associated with the first external user being at least a threshold number, a size of the aggregation of orders being at least a threshold size, or expiration of a predetermined time period. The transmitting includes communicating between the at least one application processor and the gateway cluster using a second communication protocol and a second data format different from the first communication protocol and the first data format.

DETAILED DESCRIPTION

Figure 1:
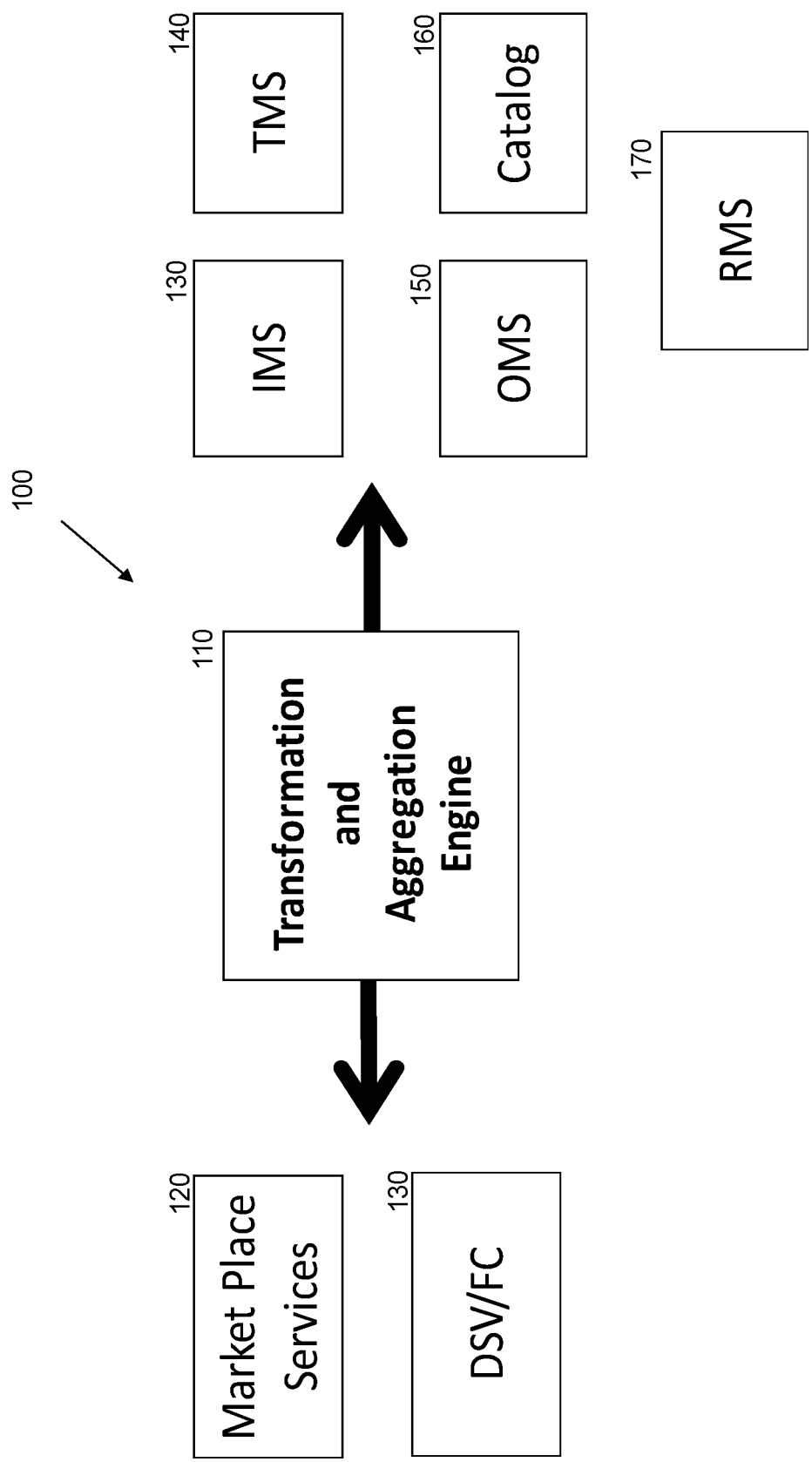
FIG. 1 is a block diagram of an exemplary system including a transformation and aggregation engine.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

This disclosure provides a transformation and aggregation engine 110 providing distributed enterprise integration services. The transformation and aggregation engine 110 can mediate between the enterprise's internal applications and heterogeneous external systems which communicate with a variety of protocols and data formats. The transformation and aggregation engine 110 enables integration at scale with multi-tenancy capabilities. The architecture of system 100, including the transformation and aggregation engine 110 supports integration as a service for seamless on-boarding of affiliates (e.g., customers and/or vendors). The system uses a metadata driven method to handle a variety of data flows, without requiring hardware or protocol changes to the external systems. The design supports configurable data processing and communication capabilities, using both push and pull models of communication. The system can easily be extended to support additional protocols and protocol and platform upgrades.

FIG. 1 is a block diagram of an exemplary environment in which system 100 can operate. The transformation and integration engine 110 interfaces with a plurality of internal applications, such as inventory management system (IMS) 130, transport management system (TMS) 140, order management system (OMS) 150 an online catalog 160 and a returns management system (RMS) 170. These are non-exclusive examples, and transformation and aggregation engine 110 can support a variety of other applications.

Transformation and aggregation engine 110 interfaces with external systems and networks, such as Market place services 120 and drop-ship vendors (DSV)/fulfillment centers 130. These external systems and networks are referred to below interchangeably as "external processors." A reference to an "external processor" herein can refer to a system having one processor, plural processors, or a network of computers and other devices.

The transformation and aggregation engine 110 can support a variety of standard transmission protocols—file transfers, services, and messaging. For example, file transfer protocol (FTP), secure shell file transfer protocol (SFTP), hypertext transfer protocol (HTTP), secure HTTP (HTTPS), structured query language (SQL), and simple mail transfer protocol (SMTP). The transformation and aggregation engine 110 can support standard formats such as JavaScript Object Notation (JSON) human-readable scripts for transmitting data objects, extensible markup language (XML), and numerous file types.

The transformation and aggregation engine 110 allows rule based transformations between various formats, and maps the data feed to or from each external affiliate. For example, the transformation and aggregation engine 110 contains rules for transformations between XML, JSON, electronic data interchange (EDI) for purchase orders and invoices, flat files, and other formats.

The transformation and aggregation engine 110 is configured to handle large sized files (for example, 50 GB files). The ability to handle large files allows the transformation and aggregation engine 110 process large incoming files, and to aggregate smaller messages and files for transmission to external systems operating in batch mode. For example, aggregation allows rule-based aggregation of messages to conform to external processor capacity. The aggregation capability handles any desired number of heterogeneous feed transmission schedules for different external processors.

Figure 2A:
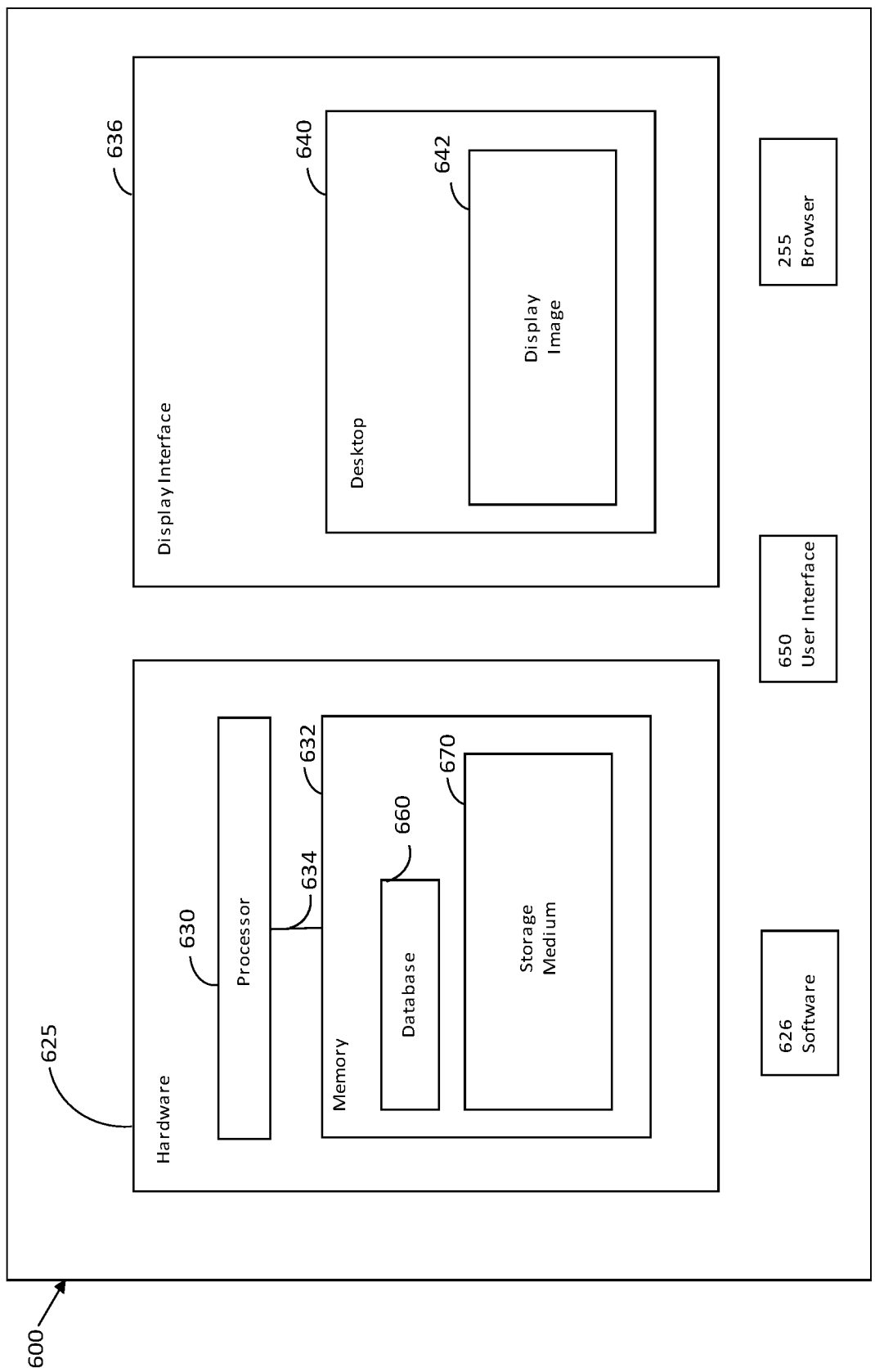
FIG. 2A is a block diagram of a computer processor used to implement components of the transformation and aggregation engine of FIG. 1.

FIG. 2A is a block diagram of an exemplary computing device 600, which may be used to implement gateway clusters 230a, 230b, application cluster 240a, 204b, database 260a, 260b, streaming server 270a, 270b, object storage 281, internal client 290 and external processor 292 (all described below with reference to FIG. 2B).

In some embodiments, computing device 600 includes a hardware unit 625 and software 626. Software 626 can run on hardware unit 625 such that various applications or programs can be executed on hardware unit 625 by way of software 626. In some embodiments, the functions of software 626 can be implemented directly in hardware unit 625, e.g., as a system-on-a-chip, firmware, field-programmable gate array ("FPGA"), etc. In some embodiments, hardware unit 625 includes one or more processors, such as processor 630. In some embodiments, processor 630 is an execution unit, or "core," on a microprocessor chip. In some embodiments, processor 630 may include a processing unit, such as, without limitation, an integrated circuit ("IC"), an ASIC, a microcomputer, a programmable logic controller ("PLC"), a programmable gate array (PGA), and/or any other programmable circuit. Alternatively, processor 630 may include multiple processing units (e.g., in a multi-core configuration). The above examples are exemplary only, and, thus, are not intended to limit in any way the definition and/or meaning of the term "processor."

Hardware unit 625 also includes a system memory 632 that is coupled to processor 630 via a system bus 634. Memory 632 can be a general volatile RAM. For example, hardware unit 625 can include a 32 bit microcomputer with 2 Mbit ROM and 64 Kbit RAM, and/or a few GB of RAM. Memory 632 can also be a ROM, a network interface (MC), and/or other device(s).

In some embodiments, computing device 600 can also include at least one media output component or display interface 636 for use in presenting information to a user. Display interface 636 can be any component capable of conveying information to a user and may include, without limitation, a display device (not shown) (e.g., a liquid crystal display ("LCD"), an organic light emitting diode ("OLED") display, or an audio output device (e.g., a speaker or headphones)). In some embodiments, computing device 300 can output at least one desktop, such as desktop 640. Desktop 640 can be an interactive user environment provided by an operating system and/or applications running within computing device 600, and can include at least one screen or display image, such as display image 642. Desktop 640 can also accept input from a user in the form of device inputs, such as keyboard and mouse inputs. In some embodiments, desktop 640 can also accept simulated inputs, such as simulated keyboard and mouse inputs. In addition to user input and/or output, desktop 640 can send and receive device data, such as input and/or output for a FLASH memory device local to the user, or to a local printer.

In some embodiments, display image 642 can be presented to a user on computer displays of a remote terminal (not shown). For example, computing device 600 can be connected to one or more remote terminals (not shown) or servers (not shown) via a network (not shown), wherein the network can be the Internet, a local area network ("LAN"), a wide area network ("WAN"), a personal area network ("PAN"), or any combination thereof, and the network can transmit information between computing device 300 and the remote terminals or the servers, such that remote end users can access the information from computing device 600.

In some embodiments, computing device 600 includes an input or a user interface 650 for receiving input from a user. User interface 650 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used. Computing device 600 can also include a web browser 655, such as "CHROME" from Google, LLC of Mountain View, Calif., "SAFARI" from Apple Inc. of Cupertino, Calif., "FIREFOX" from Mozilla Foundation of Mountain View, Calif., or the like. The web browser 655 (referred to below the browser) is a software application for retrieving, presenting and traversing information resources on the World Wide Web or a web server in a private network. The browser 655 can render content (e.g., images), audio, video, and XML files, and may have plug-ins to support Flash applications and Java applets. An information resource is identified by a Uniform Resource Identifier (URI/URL) that may be a web page, image, video or other piece of content.

Computing device 600, in some embodiments, can include a database 660 within memory 632, such that various information can be stored within database 660. Alternatively, in some embodiments, database 660 can be included within a remote server (not shown) with file sharing capabilities, such that database 660 can be accessed by computing device 600 and/or remote end users. In some embodiments, a plurality of computer-executable instructions can be stored in memory 632, such as one or more computer-readable storage media 670 (only one being shown in FIG. 2A). Computer storage medium 670 includes non-transitory media and may include volatile and nonvolatile, removable and non-removable mediums implemented in any method or technology for storage of information such as computer-readable instructions, data structures, program modules or other data.

Figure 2B:
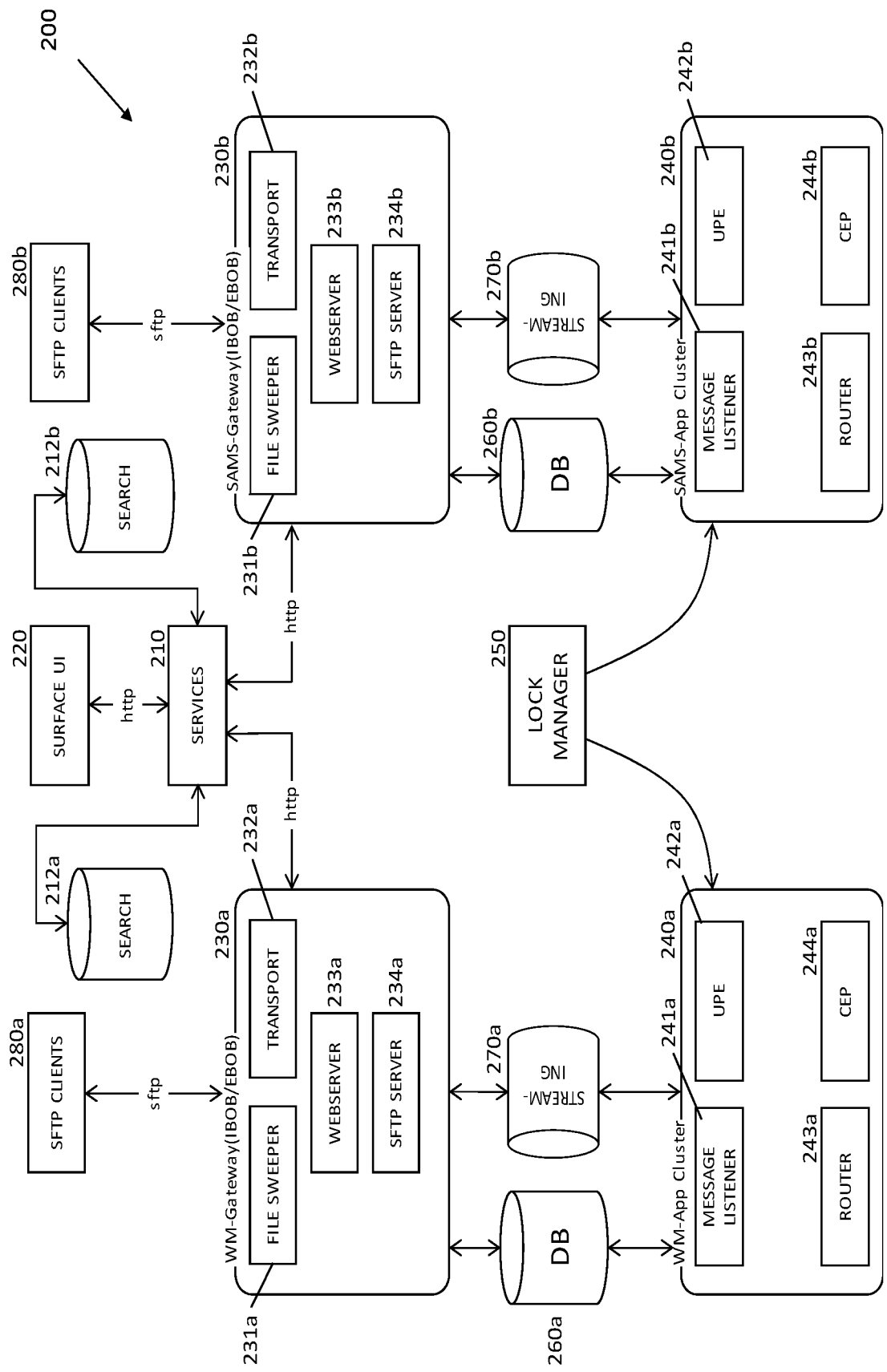
FIG. 2B is a block diagram of the transformation and aggregation engine of FIG. 1.

FIG. 2B is a block diagram of an exemplary transformation and aggregation engine 110. The transformation and aggregation engine 110 is configured for elastic cloud deployment to scale capacity dynamically. Application clusters 240a, 240b are provided for servicing internal applications (e.g., IMS 130, TMS 140, OMS 150, catalog 160 and RMS 170) and performing transformation and processing. Gateway clusters 230a, 230b provide a store-and-forward function, receiving messages using an external protocol and forwarding the messages to the application cluster using an internal protocol. Gateway clusters 230a, 230b can be hosted separately from application clusters 240a, 240b allowing independent capacity management and scaling. For example, instances of any or all of the internal applications can be added or removed dynamically without impacting the configuration of any of the external systems 120, 130 or gateway clusters 230a, 230b. Although FIG. 2B shows two application clusters 240a, 240b and two gateway clusters 230a, 230b, this is configuration is only an example, the transformation and aggregation engine 110 can include any number of application clusters 240a, 240b and any number of gateway clusters 230a, 230b.

The separation of application clusters 240a, 240b and gateway clusters 230a, 230b and the availability of numerous protocol conversions and format transformations allows for quick provisioning of new external vendors. In some embodiments, format transformations are facilitated by template-driven on-boarding.

In some embodiments, all the application servers are provisioned as clouds. The applications can share pools of configurable system resources and higher-level services (e.g., virtual machines (VMs), servers, storage, load balancing, database management) that can be rapidly provisioned with minimal management effort. Reference to a "processor" herein can refer to a VM or a "bare metal" processor running a native operating system.

The architecture is horizontally scalable at each layer, allowing the administrator to add or remove nodes of the system 100, such as adding a new computer for a distributed software application. An application cluster 240a, 240b can be scaled out from one Web server system to any desired number to consistently support a desired quality of service (QoS), even as the number of users and external affiliates grows. For example, the transformation and aggregation engine 110 can be scaled from supporting 10,000 affiliates to 100,000 affiliates by adding servers, and an external affiliate can be provisioned.

As an integration platform, transformation and aggregation engine 110 can run different applications on different VMs. Transformation and aggregation engine 110 has an inbuilt mechanism to optimally distribute applications among available VMs, to effectively utilize the hardware/software resources. The transformation and aggregation engine 110 uses rule templates that can be reused for any desired number of affiliates, ensuring consistency and reducing provisioning time. For example, five rule templates can support on-boarding of most external system.

Each application cluster 240a, 240b has access to a distributed database management system (DBMS) 260a, 260b configured to handle large amounts of data across a plurality of servers and/or a plurality of data centers. The distributed nature of the transformation and aggregation engine 110 provides high availability. In some embodiments, the DBMS 260a, 260b provides asynchronous masterless replication, allowing any node to service any request. In some embodiments, the database uses an object-based storage architecture as a file repository. allowing each object to contain payload data, a variable amount of metadata, and a globally unique identifier. In some embodiments, the DBMS 260a, 260b is a non-relational database, such as "CASSANDRA" from Apache Software Foundation of Forest Hill, Md.

In some embodiments, the object storage 281 (shown in FIG. 4) can use "OPENSTACK®" Object Storage "SWIFT" from the OpenStack Foundation of Austin, Tex., a scalable redundant storage system. The object storage 281 makes virtual servers and other resources available to clients to control heterogeneous, multi-vendor hardware pools of processing, storage, and networking resources. In some embodiments, objects and files can be written to multiple drives in the data center. The OpenStack software can ensure data replication and integrity across each application cluster. Some embodiments use Swift to scale storage clusters horizontally by adding new servers. In response to a failure of any storage drive, OpenStack replicates its content from other active nodes to new locations in the cluster.

In some embodiments, firewall management is virtual IP based. The virtual IP addresses are different from the shared firewall's "real" IP addresses. The virtual IPs provide network address translation (NAT). Virtual IP enables load-balancing by distributing requests to a cluster of application virtual machines thus enabling high availability of the overall system.

In some embodiments, a lock manager 250 maintains a system of locks and leader election. The lock manager 250 can maintain configuration information, naming, distributed synchronization, and group services. As internal request messages (e.g., purchase orders) are received from internal users, the lock manager maintains locks on the database 260a, 260b, allowing only one user at a time to store a record in the database for inline aggregation of orders.

In some embodiments, the lock manager 250 selects one of the VMs to be a leader (and the remaining VMs are followers). For example, when a first VM sends a request to lock manager 250 to make that VM the leader of all messages relating to the same combination of external affiliate and message type, lock manager 250 makes that VM the leader. The remaining VMs become followers for that combination of external affiliate and message type, until the leader relinquishes the lock.

When the message listener 241a, 241b receives an internal message, the message is saved to persistent storage and is sent to via SFTP transport to the fulfillment centers. The lock is released in zookeeper DB. In some embodiments, the lock manager 250 can acquire locks on both the fulfillment center or fulfiller (via which the order is fulfilled, where each fulfiller is represented by an ID in the system) and message type combination. When an application acquires the locks from the lock manager 250, the application starts aggregating the records. In some embodiments, the lock manager 250 is "ZOOKEEPER" from the Apache Software Foundation, Wakefield, Mass. After records are aggregated, the records are stored in a persistent file, which is sent to via SFTP transport to the fulfillment centers. The lock is released in zookeeper DB.

The lock manager 250 also provides a "heart beat" mechanism that allows lock manager 250 to detect the failures of the leader VM, and elects a new leader, if the leader is down. The lock manager 250 periodically polls each VM. If the lock manager 250 does not receive any response from a VM, the lock manager 250 assumes that VM is down. The lock manager 250 appoints a new leader VM for handling the next transaction.

The transformation and aggregation engine 110 uses a streaming server 270a, 270b as a "distributed commit log" or "distributing streaming platform." The streaming server 270a, 270b acts as a database commit log to provide a persistent record of all transactions (e.g., orders and returns) so they can be replayed to rebuild the state of the transformation and aggregation engine 110. In some embodiments, data are stored within streaming server 270a, 270b, in order, and can be read deterministically. The streaming server 270a, 270b can be distributed within the transformation and aggregation engine 110 to provide additional protections against failures, and provide scaling performance. The streaming server 270a, 270b should be a high-throughput, low-latency platform for handling real-time data feeds. In some embodiments, the streaming server 270a, 270b can be implemented using Apache "KAFKA" from the Apache Software Foundation, Wakefield, Mass. In some embodiments, a respective separate Kafka topic is used for each respective external (vendor or DSV) processor. In some embodiments, streaming server 270a, 270b also serves as the internal messaging system of transformation and aggregation engine 110.

The transformation and aggregation engine 110 has a search server 212a, 212b. The transformation and aggregation engine 110 is event driven. Internal events may be generated at periodic intervals. The transformation and aggregation engine 110 can use the search server 212a, 212b to check whether a file has been received or sent. In some embodiments, documents are indexed in search server 212a, 212b over HTTP, via formats such as JSON, XML, a table of comma-separated values (CSV), or binary. In some embodiments, the applications can query search server 212a, 212b via HTTP GET, and receive JSON, XML, CSV or binary results. For example, in some embodiments, the search server 212a, 212b can comprise Apache "SOLR™" from the Apache Software Foundation, Wakefield, Mass.

In some embodiments, the search server 212a, 212b provides an inbuilt alerting and monitoring system. For example, assume a file is scheduled to arrive from an external affiliate by 9 AM but did not arrive. Events can be generated in a given interval and the search server 212a, 212b can check whether the file has been received or sent. If the search criteria matches, the file has been received or sent. The alerting and monitoring system can be integrated with an internal/external monitoring systems using a tool such as "SLACK" ("Searchable Log of All Conversation and Knowledge") from Slack Technologies of Vancouver, British Columbia. Alternatively, or an email program.

A services cluster 210 provides administrative services and tools including an administrator dashboard, maintenance window viewer, maintenance schedule editor, and report generator.

A surface user interface 210 provides internal users and the administrator with graphical input windows and standardized output and report displays.

Each tenant can have one or more application cluster 240a, 240b. Each application cluster 240a, 240b has a respective message listener 241a, 241b. Once an external user (affiliate) is on-boarded, the message listener 241a, 241b listens for changes in the database 260a, 260b, which generate and event. In some embodiments, the events can be time-based (i.e., passage of a predetermined interval) or condition-based (e.g., collection of a predetermined number of orders, accumulation of an order in a file of a threshold size. The event generation can use a sliding window. For example, in some embodiments, a clock (not shown) which triggers an event (upon expiration of a threshold period) can be reset, when a condition-based event is triggered. In response to generation of an event, the message listener 241a, 241b initiates an aggregation and transmission process. The aggregation trigger frequency is controlled by a time-request length window based flow controller configured by the profile from the external affiliate during on-boarding.

Each application cluster 240a, 240b has a respective universal processing engine (UPE) 242a, 242b. UPE 242a, 242b. UPE 242a, 242b performs application processing flows on incoming messages. UPE 242a, 242b can perform protocol conversion, file splitting, and message aggregating. For example, UPE 242a, 242b can perform protocol conversions, or split a large file into smaller chunks. UPE 242a, 242b can provide a user searching, viewing capacity, and an interface to the data stores in database 260a, 260b. UPE 242a, 242b performs aggregation and event triggering within each respective application cluster 240a, 240b. When file is ready, hand off to gateway layer and gateway layer sends to partner.

The UPE 242a, 242b handles different file formats The transformation and aggregation engine 110 is configured to supports a variety of industry standard file formats (such as .XML, .EDI, .JSON, and .WFF, for example). The transformation and aggregation engine 110 maintains a consistent way of transforming the files irrespective of the data format. For example, the UPE 242a, 242b of transformation and aggregation engine 110 can use custom widgets of smooks for all transformations, so that the result of the transformation is always consistent, irrespective of inbound and outbound file formats.

Each application cluster 240a, 240b has a respective is complex event processing (CEP) module 244a, 244b. CEP module 244a, 244b stores individual affiliates' rules and applies rules-based order message transmission to individual affiliates. There can be many external affiliates (e.g., vendors and DSVs) in the distributed system 100 (e.g., 1,000 external affiliates). CEP module 244a, 244b can maintain and apply each rule set up by a respective vendor or DSV.

For instance, for a given facility the time-request length window can be configured as {"duration": "2 min", "message_count": "100", "process_type": "OrderRequest" "partnerId": "6559"}. This would be interpreted by the transformation and aggregation engine 110 to aggregate all OrderRequest messages for partner 6559 arriving in the 2 min window for a max event length of 100.

A second vendor may be configured to receive not more than 200 orders in 3 minutes. The transformation and aggregation engine 110 is configured to transmit aggregated orders to the first and second vendors using differently sized aggregated orders with different file size on different (and overlapping) schedules. This is only a simplified example. CEP module 244a, 244b can initiate translation and aggregation of orders for each external affiliate according to its own individual schedule based on these rules. In some embodiments, the CEP module 244a, 244b can initiate transformation and aggregation of orders for thousands of affiliates, with schedules that can overlap in time.

CEP module 244a, 244b generates the events that trigger processing by UPE 242a, 242b. The type of triggering event is configurable based on each vendor's/DSV's specifications, as input to the transformation and aggregation engine 110 during on-boarding. CEP module 244a, 244b and UPE 242a, 242b handle batching and timing at the application level. Thus, configuration of the transformation and aggregation engine 110 can be performed easily during on-boarding by having the user interface with the surface user interface 210 to identify parameters regarding format, frequency, volume and interval constraints, and communication protocol. After on-boarding, CEP module 244a, 244b generates and transmits the events for each affiliate to UPE 242a, 242b. Upon receiving each event notification, UPE 242a, 242b transforms the corresponding aggregated order to the individual format expected by each respective affiliate. Batches are created using rules to cover flow control. The rules can specify how to process requests in a controlled process using a time window-sliding window. E.g., a rule may specify that a batch containing up to 100 messages can be processed within any 2 minute window. The requests are processed and delivered to UPE.

Each application cluster 240a, 240b has a respective router 243a, 243b for handling the communication with distributed internal users and customers.

Each gateway cluster 230a, 230b has a transport server 232a, 232b, a cleaning utility 231a, 231b, a webserver 233a, 233b, and an SFTP server 234a, 234b. The cleaning utility 231a can remove temporary files and duplicate files that may accumulate during operation. In some embodiments the cleaning utility is a file sweeper 231a, 231b. When a file is dropped from the external affiliate to the gateway transport server 232a, 232b, the file sweeper 231a, 231b sweeps the file (e.g., for malware), stores the file in object storage 281, creates a metadata object with reference to object storage 281, and deletes the file from the gateway transport server 232a, 232b. Thus, the VMs are not exhausted by large files, as the files are deleted immediately after storage in object store 281. Subsequently, other processes can access the file directly from object storage 281 (e.g., as when the system has reference to the file). This allows other processes to process data from the file in parallel.

The transport server 232a, 232b handles connection-oriented communication, reliability, flow control, and multiplexing with external computers using any of a variety of protocols. In some embodiments, transport server 232a, 232b is configured for connection-oriented communication with external networks using transmission control protocol (TCP), Datagram Congestion Control Protocol (DCCP) or the Stream Control Transmission Protocol (SCTP) at the transport layer.

The webserver 233a. 233b provides HTTP communications between the webserver 233a. 233b and external affiliates' computers. HTTP is one of the protocols via which partners/distributors can integrate with the system. In some embodiments, the external computer transmits a pull-type request for a batch of orders to webserver 233a. 233b using an HTTP request, and the application cluster 240a, 240b sends the file by HTTP response.

The SFTP server 234a, 234b transmits files to the SFTP clients 280a, 280b and external networks by secure shell FTP, using both push and pull models of communication. The transformation and aggregation engine 110 can also function as a virtual SFTP server in a Partner-File Pull-mode. Transformation and aggregation engine 110 provides a virtual SFTP, such that clients can reach to any one of underlying virtual machines via VIP address. This virtual SFTP method is scalable model in cloud environments.

In some embodiments, the lock manager 250, DBMS 260a, 260b, streaming server 270a, 270b, and search server 212a, 212b and widgets are loosely coupled, allowing individual updating and/or replacement.

Figure 3:
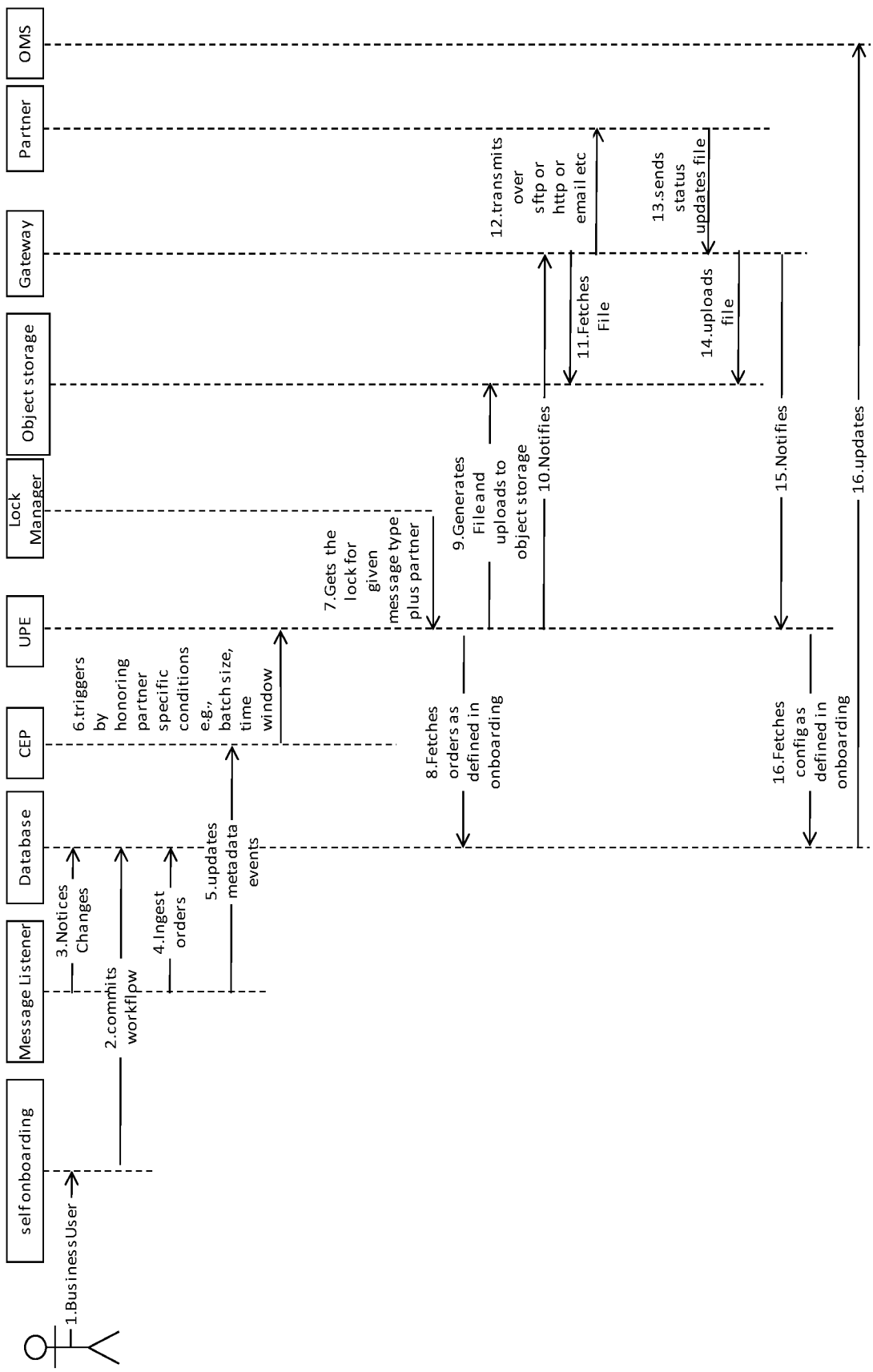
FIG. 3 is a data flow diagram for a method of operating the system of FIG. 2B.

FIG. 3 is a diagram showing an example of a control flow in the transformation and aggregation engine 110.

At data flow 1, the services cluster 210 of the transformation and aggregation engine 110 receives the details from the user inputs and inserts the affiliate's profile into its tables. The details can include source/destination SFTP/HTTP end points and transformation rules. In data flow 1, an external business user undergoes the self on-boarding using a set of input templates. Any new department, facility or business entity can use self on-boarding feature obtain an account. In some embodiments, the user interface 220 of the transformation and aggregation engine 110 dynamically renders screens that allow the user to onboard, providing different flows for order management, inventory management, returns management etc. For example, the user can input the affiliate ID, name, templates, categories, and the like. A template can provide business flows that are mapped to business categories to which the user responded. The on-boarding process inputs business/operations/device constructs (e.g., using XML). Like web page on service. The services cluster 210 receives and uploads the affiliate's information to the transformation and aggregation engine 110.

The onboarding process supports multi-tenancy. A two internal tenant system may include a first tenant comprising gateway cluster 230a and application cluster 240a, and a second tenant comprising gateway cluster 230b and application cluster 240b. Each tenant can correspond to a respectively different business unit (e.g., WalMart and Sam's Club). In some embodiments, all the external affiliate configurations are categorized as either: (1) common-configuration, or (2) tenant specific. An external affiliate having a common configuration uses the same parameters for communication with both tenants. An external affiliate having a tenant-specific configuration uses a different set of configuration parameters for communication with each tenant.

Common configurations override Tenant specific configurations. As this platform is configuration driven, it is capable of enabling multitenant configurations. For example, the system can allow Sam's and Walmart.com to run as two multiple tenants.

In data flow 2, order management sends orders to transformation and aggregation engine 110 via Kafka topic. The work flows are committed to the rules database 260a, 260b.

In data flow 3, once a new user is on-boarded, the message listener 241a listens for messages indicating changes (e.g., incoming orders or outgoing returns from internal users) that involve the on-boarded affiliate. The events indicate that sufficient data have been accumulated to process inbound and outbound files. Upon receiving an interrupt indicating that the event occurred, the message listener 241a notifies the database 260a. When inbound/outbound files arrive, transformation and aggregation engine 110 automatically maps to the configuration in DB and process them.

In data flow 4, the message listener 241a continues to listen for messages (e.g., orders) from internal users. As and when each message arrives, it is stored in the database in persistent storage. (e.g., a "CASSANDRA" database).

In data flow 5, the message listener 241a sends an interrupt to CEP module 244a, 244b and provides updated metadata related to the received message to the CEP module 244a, 244b. As there are multiple underlying virtual machines in each application cluster 240a, 240b, it is desirable to make the data available to any one of the virtual machines, since a client request can land in any one of the virtual machines. Thus, transformation and aggregation engine 110 incorporates an SFTP server, which can virtually serve the requests by fetching the requested metadata from the database 260a, 260b and stream the files from object storage 281 directly.

In data flow 6, in response to the received interrupt, the CEP module 244a, 244b follows the affiliate specific rules by generating and transmitting an event to UPE 242a, 242b indicating that a trigger condition (e.g., sufficient number of orders, sufficient order size, or passage of a predetermined time interval) has occurred.

At data flow 7, UPE 242a, 242b in one of the clusters 240a, 240b requests and obtains the lock from the lock manager 250. Only one thread can acquire a lock for a given combination of affiliate (e.g., distributor, vendor, or DSV) and message type (order or return), which helps preserve the chronological order processing sequence for a given affiliate. For each transaction (order or return), only one lock is granted at a time. This prevents two clusters or two virtual machines from committing the same transaction to the database 260a, 260b twice. Once one of the UPEs 242a, 242b acquires the lock (from the lock manager 250) that UPE begins aggregate messages for that distributor/message type combination and starts aggregating the records.

At dataflow 8, UPE 242a, 242b fetches a batch of orders (in accordance with different batching/time windows, as specified in the user profile data collected during on-boarding) from the database 260a, 260b. In one example, partner 1 (an affiliate) can take only 100 records in a file and 20 files in an hour. Rules are dynamically fetched from the database 260a, 260b and processed in runtime, enabling (individual user) a configuration driven, zero-deployment-delay approach. The time windows for heterogeneous users can be interleaved without any additional deployment time. Orders for each combination of external affiliate (external processor) and message type are processed concurrently.

At dataflow 9, UPE 242a, 242b generates an aggregated order file containing the corresponding number of records (e.g., 100 records), and uploads the file to object storage 281 (e.g., "SWIFT").

At dataflow 10, UPE 242a, 242b generates a notice indicating that the aggregated order file is ready for transmission and sends a notification to the SFTP server 234a, 234b or the webserver 233a, 233b in the gateway cluster 230a, 230b.

At dataflow 11, the SFTP server 234a, 234b or the webserver 233a, 233b in the gateway cluster 230a, 230b fetches the aggregated order file from the object storage 281. After the records are aggregated, it is stored in a persistent file and is sent via SFTP server 234a, 234b to the external affiliates (e.g., fulfillment centers). The lock is released in zookeeper DB.

At dataflow 12, the SFTP server 234a, 234b or the webserver 233a, 233b in the gateway cluster 230a, 230b transmits the aggregated order to the external affiliate (vendor or DSV) via SFTP or HTTP, respectively. In other embodiments, the application cluster can transmit the data using an SQL loader or another queuing mechanism.

The transformation and aggregation engine 110 is scalable. For example, if external Partner A transfers a 50 GB file, the transformation and aggregation engine 110 uploads the file to object storage 281 and keeps a reference. The transformation and aggregation engine 110 sends notification to external Partner B, and Partner B can download the file via transformation and aggregation engine 110's SFTP/HTTP end point. The transformation and aggregation engine 110 streams the file directly from object storage 281 to Partner B. This allows to scale to process any sized file.

At dataflow 13, the external affiliate sends a status, acknowledging receipt, and updates the file "ORDER STATUS FILEs" sent by the distributor confirming fulfillment of order to the SFTP server 234a, 234b or the webserver 233a, 233b in the gateway cluster 230a, 230b updates the file in the object storage 281.

At dataflow 14, the SFTP server 234a, 234b or the webserver 233a, 233b in the gateway cluster 230a, 230b notifies UPE 242a, 242b.

At dataflow 15, UPE 242a, 242b fetches the configuration data from the database 260a, 260b, as defined by the external affiliate during on-boarding.

At dataflow 16, the database 260a, 260b provides updates to the OMS 150 (FIG. 1), confirming the order status.

The transformation and aggregation engine 110 described herein can spawn multiple processes for different applications and/or processes (such as IMS 130, TMS 140, OMS 150, catalog 160, and RMS 170) and/or threads. A new application, process or thread can be spawned on-the-fly, while the transformation and aggregation engine 110 is operating, and without taking the system offline. Each process is independent does not affect other flows. The transformation and aggregation engine 110 can continue transforming and aggregating orders for other affiliates, while on-boarding a new affiliate. The configuration of each application is driven by the external processor's configuration. The number of threads in each process is also configuration driven. Each process can be configured independently with rules based on the parameters input during on-boarding.

The transformation and aggregation engine 110 is a highly decoupled platform. Any cluster can be added or removed without disturbing operation of the remaining clusters.

Figure 4:
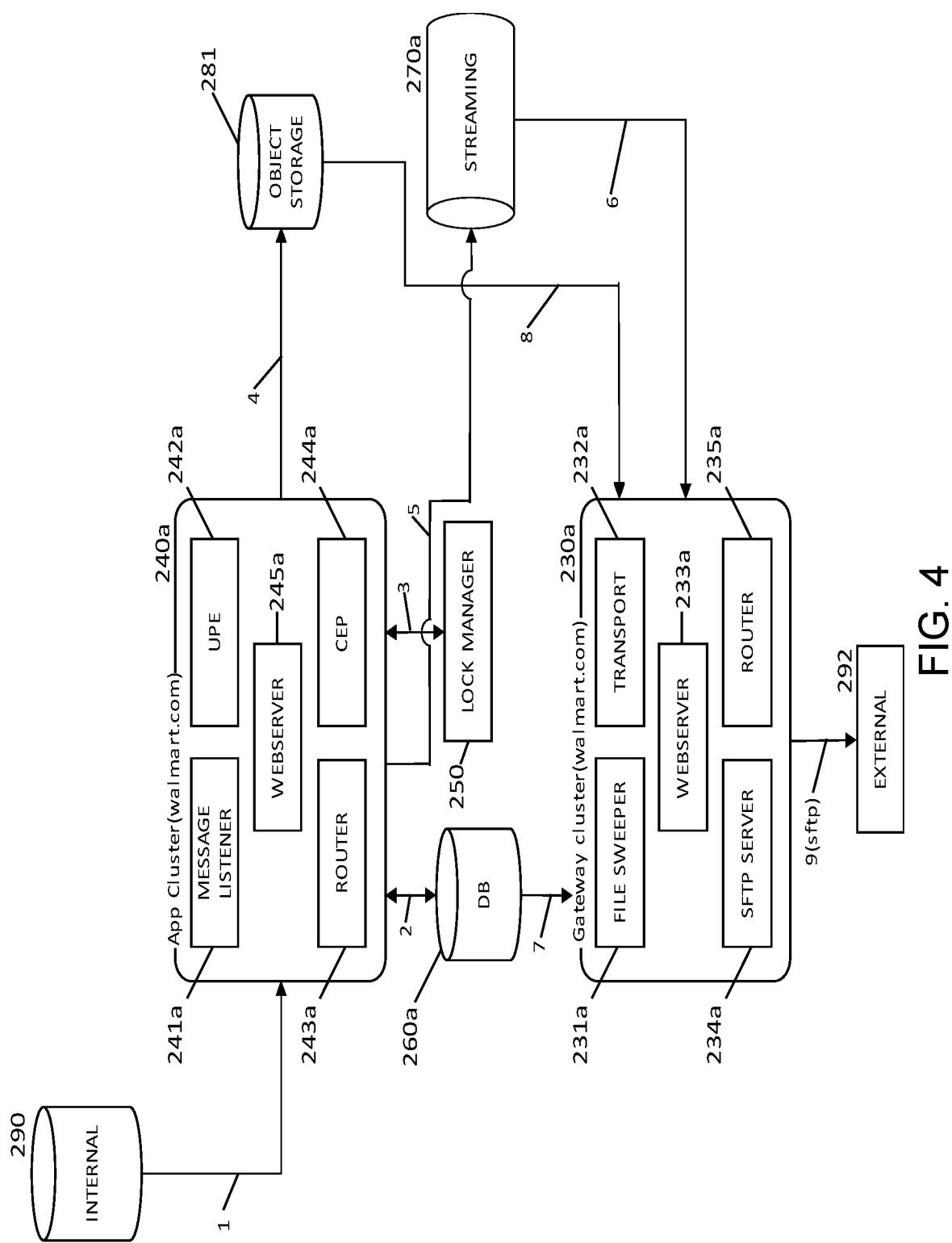
FIG. 4 is a diagram showing transmission from the internal processor to the external processor in a system according to FIG. 1.

FIG. 4 is a diagram showing the flows from an internal client 290 of a single application cluster 240a to a single external user 292.

At data flow 1, the internal users 290 issue orders to the application cluster 240a. At data flow 2, UPE 242a stores the metadata for the orders to the database 260a. In data flow 3, the application cluster 240a requests the lock from the lock manager 250 and receives the lock. In data flow 4, UPE 242 aggregates the orders and stores the aggregated order to the object storage 281. In data flow 5, the transformed aggregated order is sent to the streaming server 212*a*. In data flow 6, the streaming server 212*a* transmits the transformed aggregated order to the gateway cluster 230*a* in response to an HTTP pull request. In data flow 7, the gateway cluster 230*a* fetches the metadata for the aggregated order directly from the database 260. In data flow 8, the aggregated order file can be downloaded from the object storage 281. In data flow 9, the external processor 292 can download the aggregated order file from the SFTP server 234*a*, via SFTP.

Figure 5:
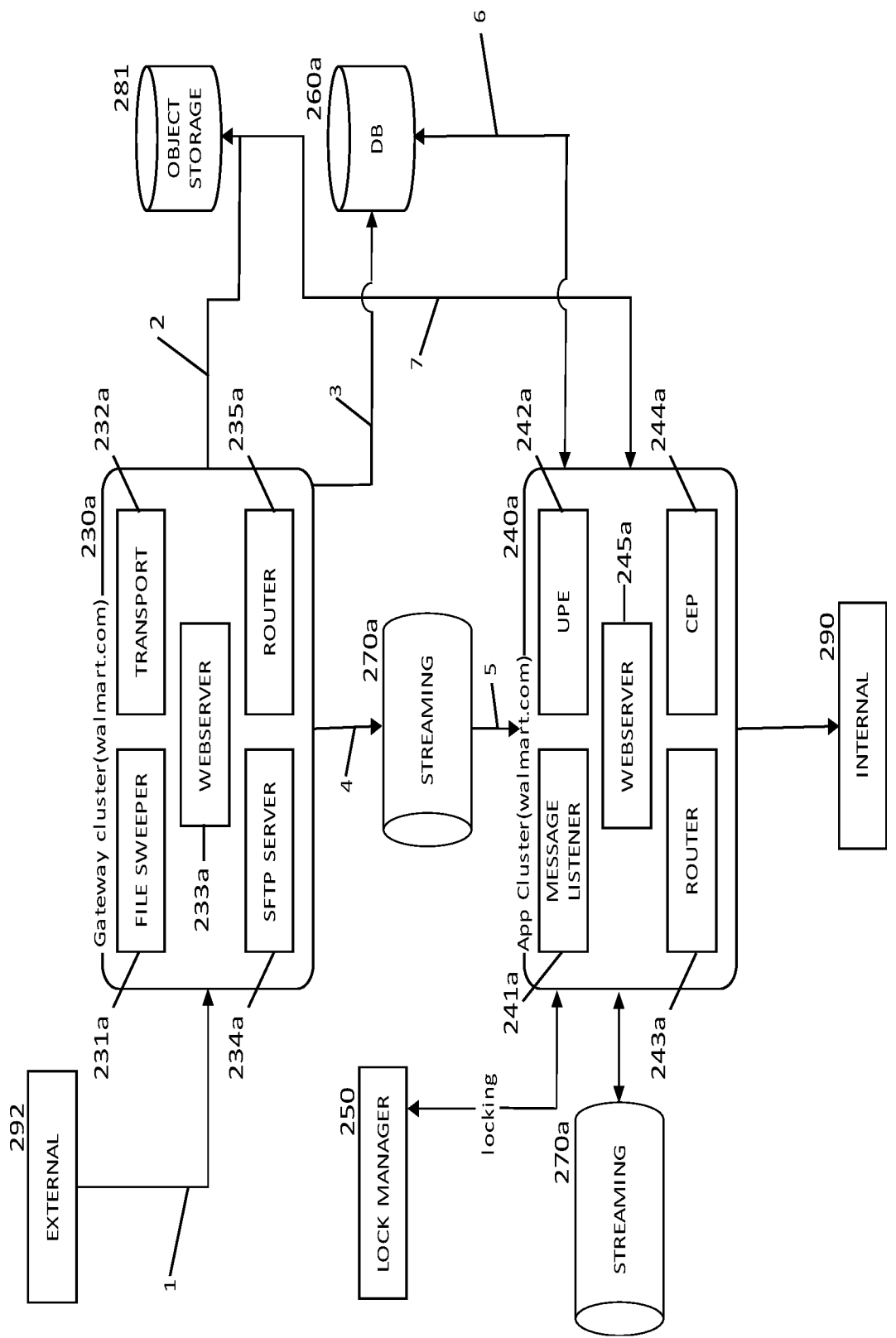
FIG. 5 is a diagram showing transmission from the external processor to the internal processor in a system according to FIG. 1.

FIG. 5 is a diagram showing the flows from a single external user 292 to an internal client 290 of a single application cluster 240*a*.

At data flow 1, the internal users 290 issue orders to the application cluster 240*a*. In data flow 3, the application cluster 240*a* requests the lock from the lock manager 250 and receives the lock.

In data flow 1, the external processor 292 uploads an aggregated return file to the SFTP server 234*a*, via SFTP. In data flow 2, the aggregated return file can be stored in the object storage 281. In data flow 3, the gateway cluster 230*a* stores the metadata for the aggregated return file in the database 260*a*. In data flow 4, aggregated return is transmitted from the gateway cluster 230*a* to the streaming server 212*a*. In data flow 5, the aggregated order is sent from the streaming server 212*a* to the application cluster 230*a*. In data flow 6, UPE 242*a* fetches the metadata for the individual orders from the database 260*a*. In data flow 7, UPE 242 obtains a lock from lock manager 250, receives the aggregated order from the object storage 281 and uses the metadata from database 260*a* to separate the orders in the aggregated order file and transform the data to the internal format.

The system can be implemented in a variety of embodiments. In some embodiments, the system 100 includes a gateway cluster 230*a* having at least one gateway processor 232*a* configured for communication with at least one external processor 292 of a first external user using a first communication protocol and a first data format. A non-transitory machine readable storage medium 260*a* is configured for storing a database containing a plurality of unfilled orders associated with the first external user. An application cluster 240*a* has at least one application processor in communication with the storage medium 260*a* for accessing the database, the at least one gateway processor 230*a* configured for communicating with the at least one application processor 240*a* using a second communication protocol and a second data format different from the first communication protocol and the first data format. The at least one application processor 240*a* is configured for fetching and aggregating unfilled orders from the database 260*a*, and transmitting an aggregation of orders to the external processor via the gateway cluster 230*a*, in response to a total number of unfilled orders associated with the first external user being at least a threshold number, a size of the aggregation of orders being at least a threshold size, or expiration of a predetermined time period.

In some embodiments, the at least one application processor 240*a* comprises a first virtual machine and a second virtual machine. The system has a lock manager 250 coupled to each of the first and second virtual machines. The lock manager 250 is capable of giving one of the first and second virtual machines a first lock for obtaining exclusive access to form an aggregation of orders for the first external processor 292 and transmit the aggregation of orders to the external processor 292 via the gateway cluster 230*a*.

In some embodiments, the first and second virtual machines are configured for requesting the first lock from the lock manager 250, generating an aggregation of order in response to receiving the first lock; and releasing the first lock after transmitting the aggregation of orders.

In some embodiments, the database 260*a* further stores a plurality of unfilled orders associated with a second vendor having a second external processor. The lock manager 250 is configured for providing a second lock to one of the first and second virtual machines while one of the first and second virtual machines has the first lock. The second lock is provided for obtaining exclusive access to form an aggregation of orders for the second vendor and transmit the aggregation of orders to the second external processor via the gateway cluster.

The first virtual machine is configured to exclude from the aggregation of orders an additional order that is added to the database while the first virtual machine has the lock.

The system can further include a streaming server 270*a* for fetching a metadata from the database 260*a* and streaming the aggregation of orders from an object storage to the gateway cluster 230*a* for delivery to the first external processor 292. Each virtual machine in the at least one application processor 240*a* is configured for initiating the streaming.

The gateway cluster 230*a* further comprises at least one secure file transfer server 234*a* coupled to the streaming server for transmitting the aggregation of orders to the first external processor 292.

The at least one application processor comprises a first application processor 240*a* and a second application processor 240*b*. The lock manager 250 is coupled to each of the first and second application processors 240*a*, 240*b*. The lock manager 250 is capable of giving one of the first and second application processors 240*a*, 240*b* a lock for obtaining exclusive access to form an aggregation of orders and transmit the aggregation of orders to the external processor 292 via the gateway cluster 230*a*.

The first and second application processors 240*a*, 240*b* are configured for requesting the lock from the lock manager 250, generating an aggregation of order in response to receiving the lock, releasing the lock after transmitting the aggregation of orders.

The at least one application processor 240*a* is configured for serving displays to request on-boarding information from the external processor 292, receiving the onboarding information from the external processor 292, and storing profile information in the database 260*a* regarding rules for transmitting the aggregation of orders to the external processor 292.

The transformation and aggregation systems described herein provide advantages to internal systems. The transformation and aggregation systems maps data to the internal application systems' preferred interfaces. The transformation and aggregation systems can scale to meet performance requirements. To external affiliates, the transformation and aggregation systems offers both file protocol and web services interfaces. The transformation and aggregation system aggregates and transforms records into batches, can handle complex mapping requirements, can be customized to handle any data transmission frequency, output sizing, and/or proprietary formats.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A system comprising:
a gateway cluster having at least one gateway processor configured for communication with a first external processor of a first external user using a first communication protocol and a first data format,
a non-transitory machine readable storage medium configured for storing a database containing a plurality of unfilled orders associated with the first external user,
an application cluster having at least one application processor comprising a first virtual machine and a second virtual machine, the at least one application processor in communication with the storage medium for accessing the database, the at least one gateway processor configured for communicating with the at least one application processor using a second communication protocol and a second data format different from the first communication protocol and the first data format, the at least one application processor configured for fetching and aggregating unfilled orders from the database, and transmitting an aggregation of orders to the first external processor via the gateway cluster in response to a total number of unfilled orders associated with the first external user being at least a threshold number, a size of the aggregation of orders being at least a threshold size, or expiration of a predetermined time period, and
a lock manager coupled to each of the first and second virtual machines, the lock manager capable of giving one of the first and second virtual machines a first lock for obtaining exclusive access to form the aggregation of orders for the first external user.

2. The system of claim 1, wherein the first and second virtual machines are configured for:
requesting the first lock from the lock manager,
generating an aggregation of order in response to receiving the first lock; and
releasing the first lock after transmitting the aggregation of orders.

3. The system of claim 1, wherein:
the database further stores a plurality of unfilled orders associated with a second external user having a second external processor,
the lock manager is configured for providing a second lock to one of the first and second virtual machines while one of the first and second virtual machines has the first lock, where the second lock is for obtaining exclusive access to form an aggregation of orders for the second external user, and transmitting the aggregation of orders to the second external processor via the gateway cluster.

4. The system of claim 1, wherein the first virtual machine is configured to exclude from the aggregation of orders an additional order that is added to the database while the first virtual machine has the first lock.

5. The system of claim 1, further comprising a streaming server for fetching a metadata from the database and streaming the aggregation of orders from an object storage to the gateway cluster for delivery to the first external processor, wherein each virtual machine in the at least one application processor is configured for initiating the streaming.

6. The system of claim 5 wherein the gateway cluster further comprises at least one secure file transfer server coupled to the streaming server for transmitting the aggregation of orders to the first external processor.

7. The system of claim 1, wherein
the lock manager is capable of giving one of the first and second application processors a second lock for obtaining exclusive access to form an aggregation of orders and transmit the aggregation of orders to the first external processor via the gateway cluster.

8. The system of claim 7, wherein the first and second application processors are configured for:
requesting the second lock from the lock manager,
generating an aggregation of order in response to receiving the second lock; and
releasing the second lock after transmitting the aggregation of orders.

9. The system of claim 8, wherein the at least one application processor is configured for:
serving displays to request on-boarding information from the first external processor,
receiving the onboarding information from the first external processor; and
storing profile information in the database regarding rules for transmitting the aggregation of orders to the first external processor.

10. A method comprising:
receiving data from a first external processor of a first external user via a gateway cluster having at least one gateway processor, the receiving using a first communication protocol and a first data format between the first external processor and the gateway cluster,
fetching a plurality of unfilled orders associated with the first external user from a database,
aggregating the unfilled orders into a single file or message containing the aggregation of orders,
transmitting the aggregation of orders to the first external processor via the gateway cluster in response to a total number of unfilled orders associated with the first external user being at least a threshold number, a size of the aggregation of orders being at least a threshold size, or expiration of a predetermined time period, the transmitting including communicating between the at least one application processor and the gateway cluster using a second communication protocol and a second data format different from the first communication protocol and the first data format, and
receiving a first lock for obtaining exclusive access to form the aggregation of orders for the first external user.

11. The method of claim 10, further comprising:
requesting the first lock from the lock manager,
generating an aggregation of order in response to receiving the first lock; and
releasing the first lock after transmitting the aggregation of orders.

12. The method of claim 10, wherein:
fetching a plurality of unfilled orders associated with a second external user having a second external processor,
receiving a second lock while having the first lock, where the second lock is for obtaining exclusive access to form an aggregation of orders for the second external user, and
transmitting the aggregation of orders to the second external processor via the gateway cluster.

13. The method of claim 10, comprising excluding from the aggregation of orders an additional order that is added to the database while the first virtual machine has the first lock.

14. A non-transitory, machine readable storage medium encoded with program instructions, wherein when a processor executes the programmed instructions, the processor performs the method comprising:
receiving data from a first external processor of a first external user via a gateway cluster having at least one gateway processor, the receiving using a first communication protocol and a first data format between the first external processor and the gateway cluster,
fetching a plurality of unfilled orders associated with the first external user from a database,
aggregating the unfilled orders into a single file or message containing the aggregation of orders,
transmitting the aggregation of orders to the first external processor via the gateway cluster in response to a total number of unfilled orders associated with the first external user being at least a threshold number, a size of the aggregation of orders being at least a threshold size, or expiration of a predetermined time period, the transmitting including communicating between the at least one application processor and the gateway cluster using a second communication protocol and a second data format different from the first communication protocol and the first data format, and
receiving a first lock for obtaining exclusive access to form the aggregation of orders for the first external user.

15. The non-transitory, machine readable storage medium of claim 14, wherein the program instructions further configure the processor for:
requesting the first lock from the lock manager,
generating an aggregation of order in response to receiving the first lock; and
releasing the first lock after transmitting the aggregation of orders.

16. The non-transitory, machine readable storage medium of claim 14, wherein the program instructions further configure the processor for:
fetching a plurality of unfilled orders associated with a second external user having a second external processor,
receiving a second lock having the first lock, where the second lock is for obtaining exclusive access to form an aggregation of orders for the second external user, and transmitting the aggregation of orders to the second external processor via the gateway cluster.

17. The non-transitory, machine readable storage medium of claim 14, wherein the program instructions further configure the processor for excluding from the aggregation of orders an additional order that is added to the database while the first virtual machine has the lock.

18. The method of claim 10 comprising fetching a metadata from the database and streaming the aggregation of orders from an object storage to the gateway cluster for delivery to the first external processor.

19. The method of claim 10 comprising:
serving displays to request on-boarding information from the first external processor,
receiving the onboarding information from the first external processor; and
storing profile information in the database regarding rules for transmitting the aggregation of orders to the first external processor.

20. The non-transitory, machine readable storage medium of claim 14, wherein the program instructions further configure the processor for fetching a metadata from the database and streaming the aggregation of orders from an object storage to the gateway cluster for delivery to the first external processor.

* * * * *